US010497255B1

(12) United States Patent
Shmueli Friedland et al.

(10) Patent No.: US 10,497,255 B1
(45) Date of Patent: Dec. 3, 2019

(54) AUTONOMOUS VEHICLE TO PEDESTRIAN COMMUNICATION USING DIRECTIONAL SOUND

(71) Applicant: GM GLOBAL TECHNOLOGY OPERATIONS LLC, Detroit, MI (US)

(72) Inventors: Yael Shmueli Friedland, Tel Aviv (IL); Eli Tzirkel-Hancock, Ra'anana (IL); Ilan Malka, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/107,076

(22) Filed: Aug. 21, 2018

(51) Int. Cl.
| | | |
|---|---|---|
| *G08G 1/005* | (2006.01) | |
| *G05D 1/00* | (2006.01) | |
| *B60W 30/095* | (2012.01) | |
| *H04R 1/34* | (2006.01) | |
| *B60R 11/02* | (2006.01) | |
| *H04R 1/32* | (2006.01) | |

(52) U.S. Cl.
CPC .......... *G08G 1/005* (2013.01); *B60R 11/0217* (2013.01); *B60W 30/0953* (2013.01); *B60W 30/0956* (2013.01); *G05D 1/0088* (2013.01); *H04R 1/323* (2013.01); *H04R 1/345* (2013.01); *G05D 2201/0213* (2013.01); *H04R 2499/13* (2013.01)

(58) Field of Classification Search
CPC .......... B60W 30/095; B60W 30/0953; B60W 30/0956; B60W 2550/00; B60W 2550/10; G08G 1/00; G08G 1/005; H04R 1/323; H04R 1/34; H04R 1/345; H04R 2499/13; B60R 11/0217; G05D 1/0088; G05D 2201/0213
See application file for complete search history.

(56) References Cited

U.S. PATENT DOCUMENTS

| 9,928,734 | B2 * | 3/2018 | Newman | ................. B60Q 5/005 |
|---|---|---|---|---|
| 2008/0094254 | A1 * | 4/2008 | Hill | ........................... B60Q 5/00 340/944 |
| 2018/0050635 | A1 * | 2/2018 | Vincent | .................. B60Q 5/006 |

FOREIGN PATENT DOCUMENTS

JP          2007237831 A  *  9/2007  ............. B60Q 5/008

* cited by examiner

*Primary Examiner* — Brian Wilson
(74) *Attorney, Agent, or Firm* — Lorenz & Kopf, LLP (57) ABSTRACT

Systems and methods are provided in an autonomous vehicle for providing auditory guidance to a pedestrian. In one embodiment, a processor-implemented method in a vehicle for providing auditory guidance includes: identifying a desire to communicate with a pedestrian; determining a message to communicate to the pedestrian; calculating a travel path about which to make the pedestrian aware; positioning a directional acoustic device to project directional sound waves to a starting point of the travel path; modulating the message in the directional sound waves; and repositioning the directional acoustic device to project the directional sound waves with the modulated message along the travel path, wherein as the directional sound waves contact with a travel path surface the message is demodulated and a sound conveying the message appears to originate from and travel along the travel path.

20 Claims, 6 Drawing Sheets

AUTONOMOUS VEHICLE TO PEDESTRIAN COMMUNICATION USING DIRECTIONAL SOUND

TECHNICAL FIELD

The present disclosure generally relates to communication systems in autonomous vehicles, and more particularly relates to systems and methods for autonomous vehicle communication with pedestrians.

BACKGROUND

An autonomous vehicle (AV) is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While recent years have seen significant advancements in autonomous vehicles, such vehicles might still be improved in a number of respects. For example, sound can be used in a sophisticated manner to enrich communication between the AV and surrounding pedestrians.

Accordingly, it is desirable to provide systems and methods for improving the communication between an autonomous vehicle and a pedestrian. Furthermore, other desirable features and characteristics of the present invention will become apparent from the subsequent detailed description and the appended claims, taken in conjunction with the accompanying drawings and the foregoing technical field and background.

SUMMARY

Systems and methods are provided in an autonomous vehicle for providing auditory guidance to a pedestrian. In one embodiment, a processor-implemented method in a vehicle for providing auditory guidance is disclosed. The method includes: identifying, by a processor in the vehicle, a desire to communicate with a first pedestrian; determining, by the processor, a message to communicate to the first pedestrian; calculating, by the processor, a travel path about which to make the first pedestrian aware; positioning, using a vehicle actuator, a directional acoustic device to project directional sound waves to a starting point of the travel path; modulating the message in the directional sound waves; and repositioning, using the vehicle actuator, the directional acoustic device to project the directional sound waves with the modulated message along the travel path, wherein as the directional sound waves contact with a travel path surface the message is demodulated and a sound conveying the message appears to originate from and travel along the travel path.

In one embodiment, the identifying a desire to communicate comprises identifying a first pedestrian who is to enter or exit the vehicle.

In one embodiment, the identifying a desire to communicate comprises identifying a first pedestrian who may cross a pathway to be traversed by the vehicle.

In one embodiment, the identifying a desire to communicate further comprises identifying a first pedestrian who is positioned near to, moving toward, or entering the pathway to be traversed by the vehicle.

In one embodiment, determining a message to communicate comprises identifying a message to communicate that instructs the first pedestrian to enter or exit the vehicle via the travel path communicated via the message.

In one embodiment, determining a message to communicate includes identifying a message to communicate that informs the first pedestrian that the vehicle is waiting for the first pedestrian to travel along the travel path communicated via the message.

In one embodiment, determining a message to communicate comprises identifying a message to communicate that informs the first pedestrian that the vehicle intends to travel along the travel path communicated via the message.

In one embodiment, calculating a travel path comprises calculating a pedestrian travel path to or away from the vehicle.

In one embodiment, calculating a travel path comprises calculating a pedestrian travel path that crosses an intended vehicle travel path.

In one embodiment, calculating a travel path comprises calculating a vehicle travel path that crosses a potential pedestrian travel path.

In one embodiment, the method further includes repositioning the directional acoustic device to project a second set of directional sound waves with a second modulated message to a point to provide a second message to a second pedestrian that is different from the message to the first pedestrian.

A pedestrian alerting system is provided that includes a first module and a second module. The first module is configured to: identify a desire to communicate with a first pedestrian; determine a message to communicate to the first pedestrian; and calculate a travel path about which to make the first pedestrian aware. The second module is configured to: position a directional acoustic device to project directional sound waves to a starting point of the travel path; modulate the message in the directional sound waves; and reposition the directional acoustic device to project the directional sound waves with the modulated message along the travel path, wherein as the directional sound waves contact with a travel path surface the message is demodulated and a sound conveying the message appears to originate from and travel along the travel path.

In one embodiment, the second module is further configured to reposition the directional acoustic device to project a second set of directional sound waves with a second modulated message to a point to provide a second message to a second pedestrian that is different from the message to the first pedestrian.

In one embodiment, calculating a travel path comprises calculating a pedestrian travel path to or away from the vehicle.

In one embodiment, calculating a travel path comprises calculating a pedestrian travel path that crosses an intended vehicle travel path.

In one embodiment, calculating a travel path comprises calculating a vehicle travel path that crosses a potential pedestrian travel path.

In another embodiment, an autonomous vehicle (AV) is provided. The AV includes a directional acoustic device; and a pedestrian alerting module configured to: identify a desire to communicate with a first pedestrian; determine a message to communicate to the first pedestrian; calculate a travel path about which to make the first pedestrian aware; position the directional acoustic device to project directional sound waves to a starting point of the travel path; modulate the message in the directional sound waves; and reposition the directional acoustic device to project the directional sound waves with the modulated message along the travel path, wherein as the directional sound waves contact with a travel path surface the message is demodulated and a sound conveying the message appears to originate from and travel along the travel path.

In one embodiment, the directional acoustic device comprises a directional speaker containing piezoelectric transducers capable of producing ultrasonic sound waves.

In one embodiment, the directional sound waves comprise a focused column of ultrasonic sound waves.

In one embodiment, the pedestrian alerting module is configured to calculate a travel path using vehicle sensor data and/or map data.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
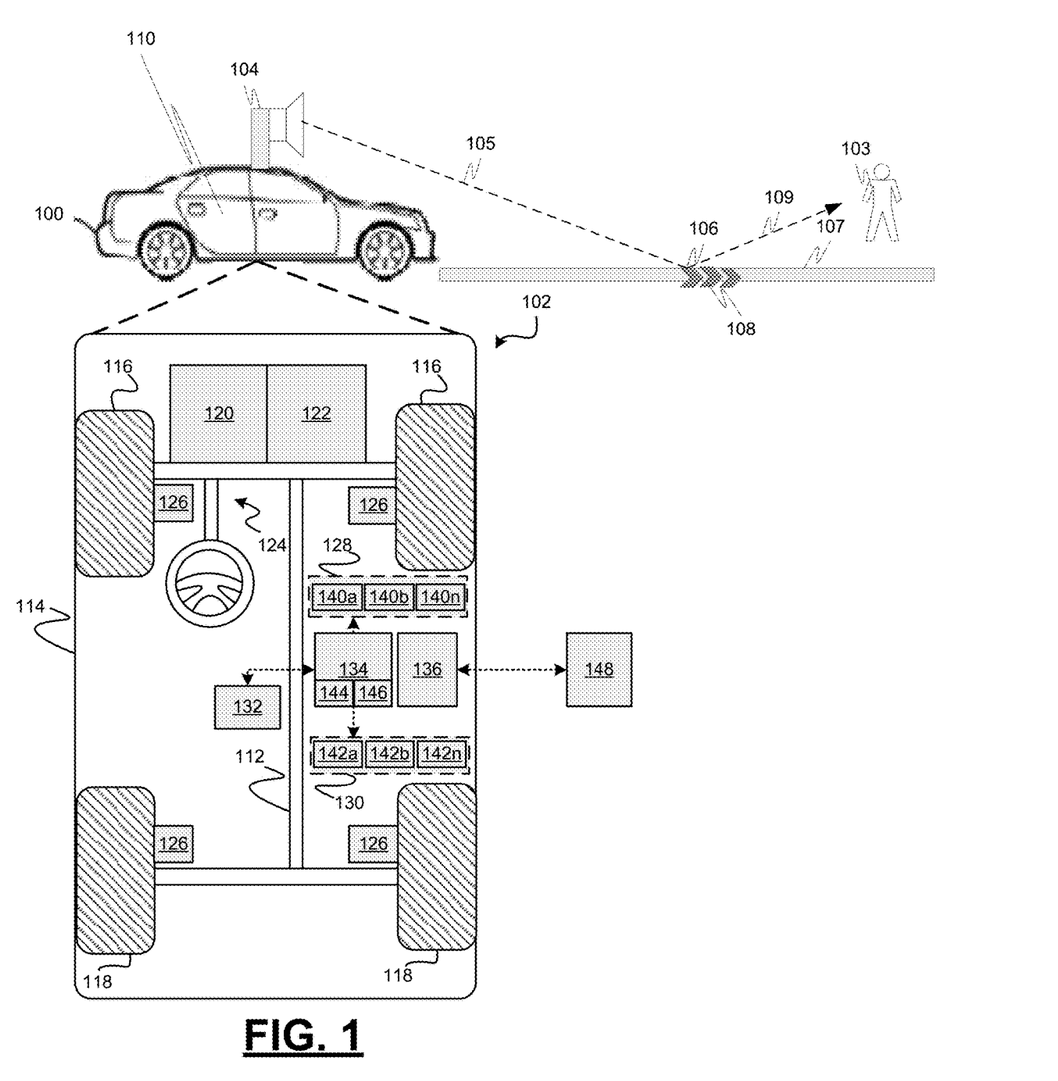
FIG. 1 is a functional block diagram illustrating an autonomous vehicle that includes a pedestrian alerting system, in accordance with various embodiments.

FIG. 1 depicts an example vehicle 100 with a pedestrian alerting system shown generally as 102. In general, the pedestrian alerting system 102 is configured to provide auditory guidance from the vehicle 100 to a pedestrian 103. As described in greater detail below, the pedestrian alerting system 102 includes a directional acoustic device 104 and a controller 134 that combine to provide auditory guidance from the vehicle 100 to the pedestrian 103 via focused sound waves 105 emanating from the directional acoustic device 104 towards a point 106 on a surface 107 such that the pedestrian 103 perceives emitted sound 109 as if it originated from the point 106 on the surface 107. The pedestrian alerting system 102 can direct the focused sound waves 105 along a path 108, by changing the location of the point 106 at which the focused sound waves 105 make contact with the surface 107, to create a sound path 108 wherein the sound appears to move along the path 108. By moving the contact point 106 along the path 108, the pedestrian alerting system 102 can make the pedestrian 103 aware of the path 108.

The example directional acoustic device 104 comprises a directional speaker containing an array of piezoelectric transducers capable of producing ultrasonic sound waves, which are at a frequency above the sound range for human ears. Ultrasonic sound waves are used, in this example, because the higher-frequency waves have a correspondingly shorter wavelength and diffract (spread out) less as they travel, which allows them to stay together in a beam for longer than sound at a wavelength that is perceptible by human ears. Also, using a plurality of small transducers can make the sound diffract less than it would from a single, large transducer. The ultrasonic sound waves travel from the directional acoustic device 104 in a narrowly focused column and when the ultrasonic sound waves contact a surface, a message, modulated within the ultrasonic sound waves, demodulates to produce a sound having a wavelength that can be perceived by human ears. The use of the directional acoustic device 104 can result in reduced noise pollution because the ultrasonic sound waves do not spread out in all directions.

The example directional acoustic device 104 produces a modulated wave made of two separate ultrasonic waves. One (the carrier wave) is a reference tone at a constant frequency (e.g., 200,000 hertz (Hz)) and the other (the modulating wave) is a signal that fluctuates (e.g., between 200,200 Hz and 220,000 Hz). When the modulated wave meets an obstruction, the carrier wave and the modulating wave slow down and mix together to interfere constructively (by adding together) and destructively (by subtracting from one another). By the principle of wave superposition, the mixing of the carrier wave and the modulating wave produces a third wave with a frequency that can be perceived by human ears (e.g., in the range 200-20,000 Hz). An electronic circuit attached to the piezoelectric transducers modulates the carrier wave.

The example vehicle 100 is a vehicle that is capable of being driven autonomously or semi-autonomously, hereinafter referred to as an autonomous vehicle (AV). The AV 100 is, for example, a vehicle that can be automatically controlled to carry passengers from one location to another. The vehicle 100 is depicted in the illustrated embodiment as a passenger car, but other vehicle types, including motorcycles, taxi cabs, vehicle fleets, buses, sedans, wagons, trucks, sport utility vehicles, other automobiles, recreational vehicles (RVs), marine vessels, locomotives, aircraft, spacecraft, and other vehicles may also be used.

As shown, the vehicle 100 generally includes a chassis 112, a body 114, front wheels 116, and rear wheels 118. The body 114 is arranged on the chassis 112 and substantially encloses components of the vehicle 100. The body 114 and the chassis 112 may jointly form a frame. The wheels 116-118 are each rotationally coupled to the chassis 112 near a respective corner of the body 114.

The vehicle 100 also generally includes a propulsion system 120, a transmission system 122, a steering system 124, a brake system 126, a sensor system 128, an actuator system 130, at least one data storage device 132, at least one controller 134, and a communication system 136. The propulsion system 120 may, in various embodiments, include an internal combustion engine, an electric machine such as a traction motor, and/or a fuel cell propulsion system.

The steering system 124 influences a position of the vehicle wheels 116 and/or 118. While depicted as including a steering wheel for illustrative purposes, in some embodiments contemplated within the scope of the present disclosure, the steering system 124 may not include a steering wheel. The steering system 124 can, for example, be an electric power steering (EPS) system, or active front steering (AFS) system.

The sensor system 128 includes one or more sensing devices 140a-140n that sense observable conditions of the exterior environment and/or the interior environment of the vehicle 100 (such as the state of one or more occupants) and generate sensor data relating thereto. Sensing devices 140a-140n might include, but are not limited to, radars (e.g., long-range, medium-range-short range), lidars, global positioning systems (GPS), optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 130 includes one or more actuator devices 142a-142n that control one or more vehicle features such as, but not limited to, the propulsion system 120, the transmission system 122, the steering system 124, and the brake system 126.

The data storage device 132 stores data for use in automatically controlling the vehicle 100. In various embodiments, the data storage device 132 stores defined maps of the navigable environment. In various embodiments, the defined maps may be predefined by and obtained from a remote system. For example, the defined maps may be assembled by the remote system and communicated to the vehicle 100 (wirelessly and/or in a wired manner) and stored in the data storage device 132. Route information may also be stored within data storage device 132—e.g., a set of road segments (associated geographically with one or more of the defined maps) that together define a route that the user may take to travel from a start location (e.g., the user's current location) to a target location. As will be appreciated, the data storage device 132 may be part of the controller 134, separate from the controller 134, or part of the controller 134 and part of a separate system.

The controller 134 includes at least one processor 144 and a computer-readable storage device or media 146. The processor 144 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 134, a semiconductor-based microprocessor (in the form of a microchip or chip set), any combination thereof, or generally any device for executing instructions. The computer readable storage device or media 146 may include volatile and nonvolatile storage in read-only memory (ROM), random-access memory (RAM), and keep-alive memory (KAM), for example. KAM is a persistent or non-volatile memory that may be used to store various operating variables while the processor 144 is powered down. The computer-readable storage device or media 146 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 100. In various embodiments, controller 134 is configured to implement the pedestrian alerting system 102.

The instructions may include one or more separate programs, each of which comprises an ordered listing of executable instructions for implementing logical functions. The instructions, when executed by the processor 144, receive and process signals (e.g., sensor data) from the sensor system 128, perform logic, calculations, methods and/or algorithms for automatically controlling the components of the vehicle 100, and generate control signals that are transmitted to the actuator system 130 to automatically control the components of the vehicle 100 based on the logic, calculations, methods, and/or algorithms. Although only one controller 134 is shown in FIG. 1, embodiments of the vehicle 100 may include any number of controllers 134 that communicate over any suitable communication medium or a combination of communication mediums and that cooperate to process the sensor signals, perform logic, calculations, methods, and/or algorithms, and generate control signals to automatically control features of the vehicle 100.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 144) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 134 may also otherwise differ from the embodiment depicted in FIG. 1, for example in that the computer system of the controller 134 may be coupled to or may otherwise utilize one or more remote computer systems and/or other control systems.

Figure 2A:
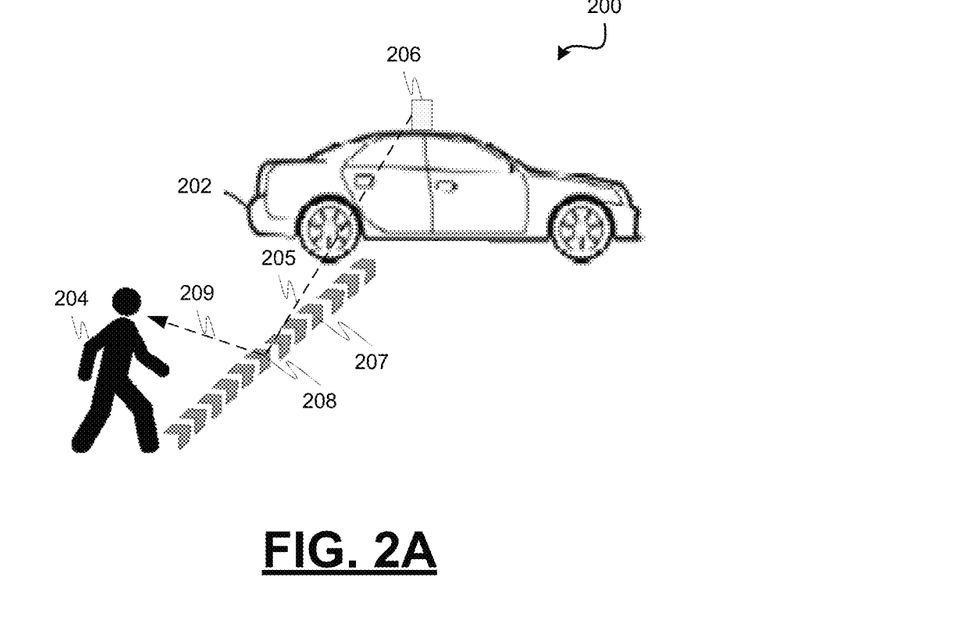
FIGS. 2A, 2B, 3A, 3B, and 4 are diagrams depicting example operating scenarios for using an example pedestrian alerting system in a vehicle, in accordance with various embodiments.

FIG. 2A is a diagram depicting an example operating scenario 200 for using an example pedestrian alerting system in a vehicle 202. The example pedestrian alerting system is configured to provide auditory guidance from the vehicle 202 to a pedestrian 204. In the example operating scenario 200, the vehicle 202 is an AV that has stopped to pick up a passenger (pedestrian 204). In this example, a rolling sound 209 can lead the way to the vehicle.

Upon coming in contact with the pedestrian 204, the AV 202 can identify a desire to communicate with the pedestrian 204, determine a message to communicate to the pedestrian 204, such as "please enter through the rear door using this path", calculate a travel path 207 (e.g., using vehicle sensor data and/or map data including calculating an azimuth to the pedestrian using vehicle sensors) about which to make the pedestrian 204 aware. Calculating a travel path, in this example, includes calculating a pedestrian travel path to the vehicle (e.g., vehicle door). The AV 202 can position (e.g., rotating left, right, up, down) a directional acoustic device 206 (e.g., directional speaker containing piezoelectric transducers capable of producing ultrasonic sound waves) to project directional sound waves 205 (e.g., a focused column of ultrasonic sound waves) to a starting point of the travel path 207; modulate the message in the directional sound waves 205; and repositioning (e.g., rotating left, right, up, down) the directional acoustic device 206 to project the directional sound waves 205 with the modulated message along the travel path 207, wherein as the directional sound waves 205 make contact with a travel path surface the message is demodulated and a sound 209 conveying the message appears to originate from and travel along the travel path 207. By changing the location of the point 208 at which the focused sound waves 205 make contact with the travel path surface, the pedestrian alerting system can create a sound path 207 wherein the sound appears to move along the path 207. By moving the contact point 208 along the path 207, the pedestrian alerting system can make the pedestrian 204 aware of the path 207.

Figure 2B:
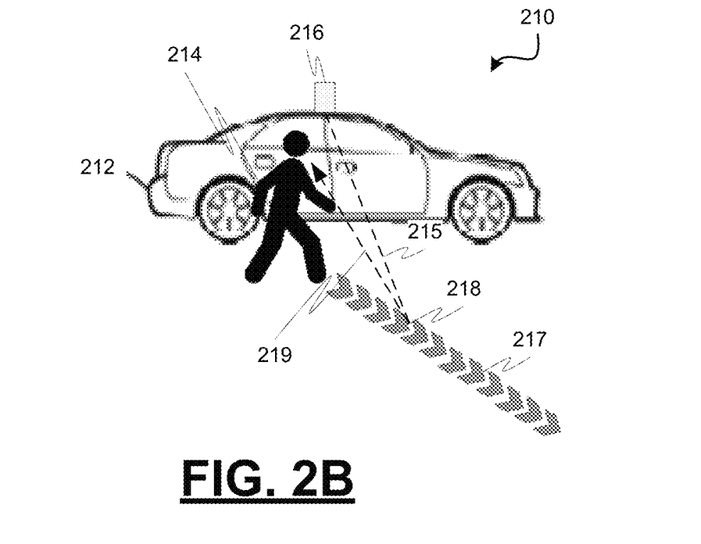

FIG. 2B is a diagram depicting another example operating scenario 210 for using an example pedestrian alerting system in a vehicle 212. The example pedestrian alerting system is configured to provide auditory guidance from the vehicle 212 to a pedestrian 214. In the example operating scenario 210, the vehicle 212 is an AV that has stopped to allow the passenger (pedestrian 214) to exit the vehicle 212. In this example, a rolling sound can lead the way away from vehicle.

Upon reaching a stopping point, the AV 212 can identify a desire to communicate with the pedestrian 214 (e.g., let the passenger know that the vehicle has reached its destination and provide a suggested path for exiting the vehicle and walking to the passenger's next destination), determine a message to communicate to the pedestrian 214, such as "please exit through the rear door and follow this path", calculate a travel path 217 (e.g., using vehicle sensor data and/or map data including calculating an azimuth to the next pedestrian destination using vehicle sensors) about which to make the pedestrian 214 aware. Calculating a travel path, in this example, includes calculating a pedestrian travel path away from the vehicle (e.g., vehicle door). The AV 212 can position (e.g., rotating left, right, up, down) a directional acoustic device 216 (e.g., directional speaker containing piezoelectric transducers capable of producing ultrasonic sound waves) to project directional sound waves 215 (e.g., a focused column of ultrasonic sound waves) to a starting point of the travel path 217; modulate the message in the directional sound waves 215; and repositioning (e.g., rotating left, right, up, down) the directional acoustic device 216 to project the directional sound waves 215 with the modulated message along the travel path 217, wherein as the directional sound waves 215 make contact with a travel path surface the message is demodulated and a sound 219 conveying the message appears to originate from and travel along the travel path 217. By changing the location of the point 218 at which the focused sound waves 215 make contact with the travel path surface, the pedestrian alerting system can create a sound path 217 wherein the sound appears to move along the path 217. By moving the contact point 218 along the path 217, the pedestrian alerting system can make the pedestrian 214 aware of the path 217.

Figure 3A:
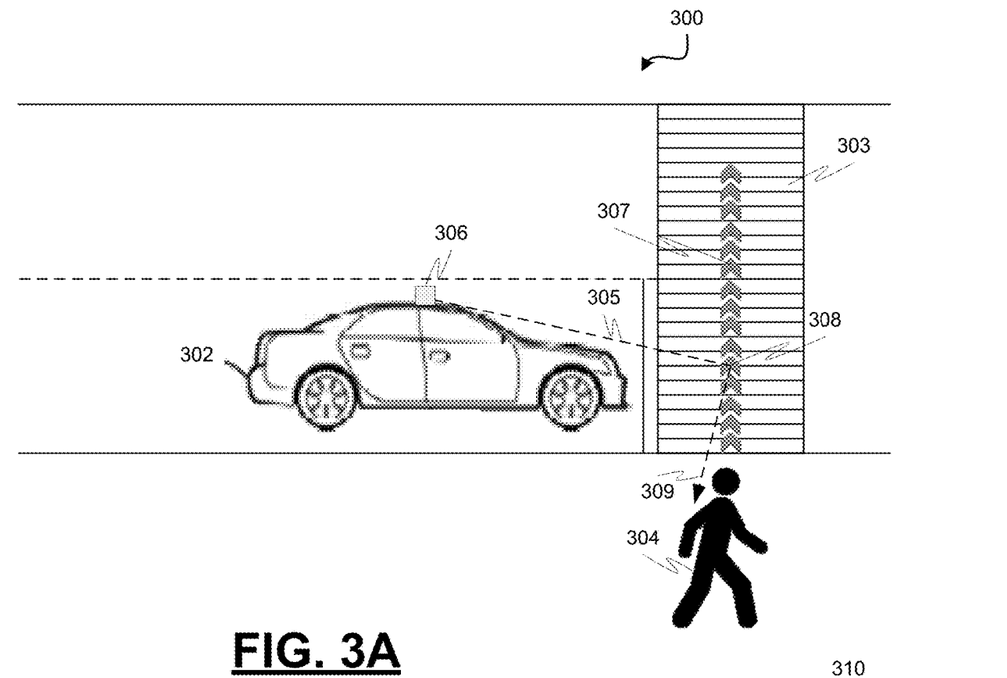

FIG. 3A is a diagram depicting another example operating scenario 300 for using an example pedestrian alerting system in a vehicle 302. The example pedestrian alerting system is configured to provide auditory guidance from the vehicle 302 to a pedestrian 304. In the example operating scenario 300, the vehicle 302 is an AV that has stopped at a crosswalk 303 to allow a pedestrian 304 to cross the street. Directional sound can be sent to pedestrians standing on the sidewalk, wherein the required walking direction may be "painted" with sound. The sound can be synchronized with a crossing visualization, if available. Providing direction sound can be effective when pedestrians hesitate to cross the street.

After stopping, the AV 302 can identify a desire to communicate with the pedestrian 304 (e.g., let the pedestrian know that the vehicle will wait for the pedestrian to cross the crosswalk), determine a message to communicate to the pedestrian 304, such as "please feel free to cross, I will wait for you to cross along the indicated path", calculate a travel path 307 (e.g., using vehicle sensor data and/or map data including calculating an azimuth to the pedestrian using vehicle sensors) about which to make the pedestrian 304 aware. Calculating a travel path, in this example, includes calculating a pedestrian travel path that crosses an intended vehicle travel path. The AV 302 can position (e.g., rotating left, right, up, down) a directional acoustic device 306 (e.g., directional speaker containing piezoelectric transducers capable of producing ultrasonic sound waves) to project directional sound waves 305 (e.g., a focused column of ultrasonic sound waves) to a starting point of the travel path 307; modulate the message in the directional sound waves 305; and repositioning (e.g., rotating left, right, up, down) the directional acoustic device 306 to project the directional sound waves 305 with the modulated message along the travel path 307, wherein as the directional sound waves 305 make contact with a travel path surface the message is demodulated and a sound 309 conveying the message appears to originate from and travel along the travel path 307. By changing the location of the point 308 at which the focused sound waves 305 make contact with the travel path surface, the pedestrian alerting system can create a sound path 307 wherein the sound appears to move along the path 307. By moving the contact point 308 along the path 307, the pedestrian alerting system can make the pedestrian 304 aware of the path 307.

Figure 3B:
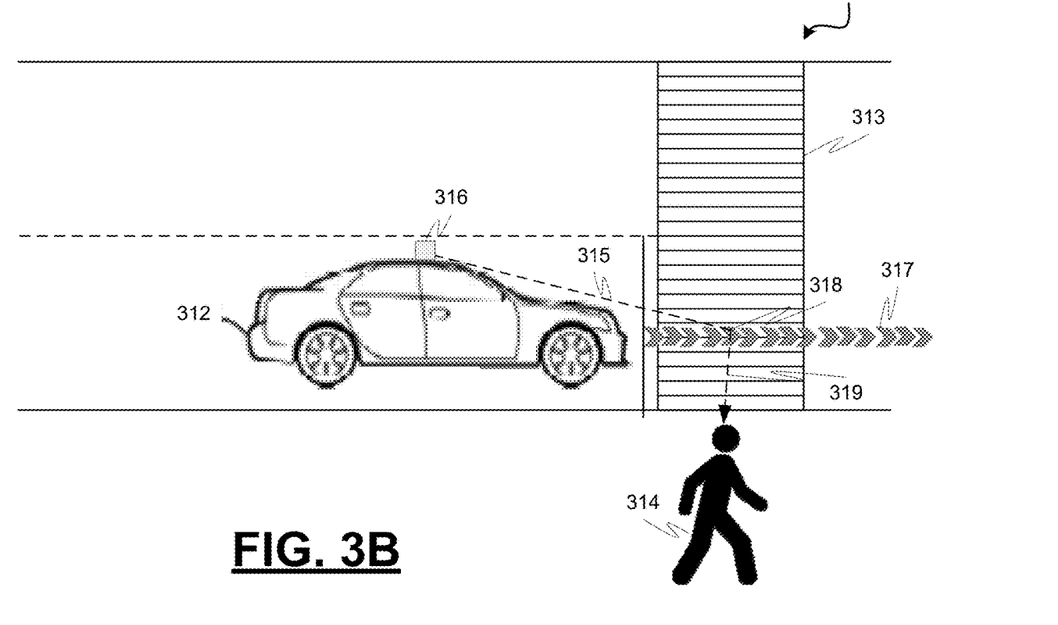

FIG. 3B is a diagram depicting another example operating scenario 310 for using an example pedestrian alerting system in a vehicle 312. The example pedestrian alerting system is configured to provide auditory guidance from the vehicle 312 to a pedestrian 314. In the example operating scenario 310, the vehicle 312 is an AV that has stopped at a crosswalk 313. In this example, when the AV decides to drive across a crosswalk with pedestrians present on the sidewalk, the AV can produce a mild rolling warning sound marking the intended driving direction After waiting at the stopping point and the pedestrian not crossing, the AV 312 can identify a desire to communicate with the pedestrian 304 (e.g., let the pedestrian know that the vehicle will proceed through the crosswalk), determine a message to communicate to the pedestrian 314, such as "please do not cross, I intend to cross the cross walk along the indicated path", calculate a travel path 317 (e.g., using vehicle sensor data and/or map data) about which to make the pedestrian 314 aware. Calculating a travel path, in this example, includes calculating a vehicle travel path that crosses a potential pedestrian travel path. The AV 312 can position (e.g., rotating left, right, up, down) a directional acoustic device 316 (e.g., directional speaker containing piezoelectric transducers capable of producing ultrasonic sound waves) to project directional sound waves 315 (e.g., a focused column of ultrasonic sound waves) to a starting point of the travel path 317; modulate the message in the directional sound waves 315; and repositioning (e.g., rotating left, right, up, down) the directional acoustic device 316 to project the directional sound waves 315 with the modulated message along the travel path 317, wherein as the directional sound waves 315 make contact with a travel path surface the message is demodulated and a sound 319 conveying the message appears to originate from and travel along the travel path 317. By changing the location of the point 218 at which the focused sound waves 315 make contact with the travel path surface, the pedestrian alerting system can create a sound path 317 wherein the sound appears to move along the path 317. By moving the contact point 318 along the path 317, the pedestrian alerting system can make the pedestrian 314 aware of the path 317.

Figure 4:
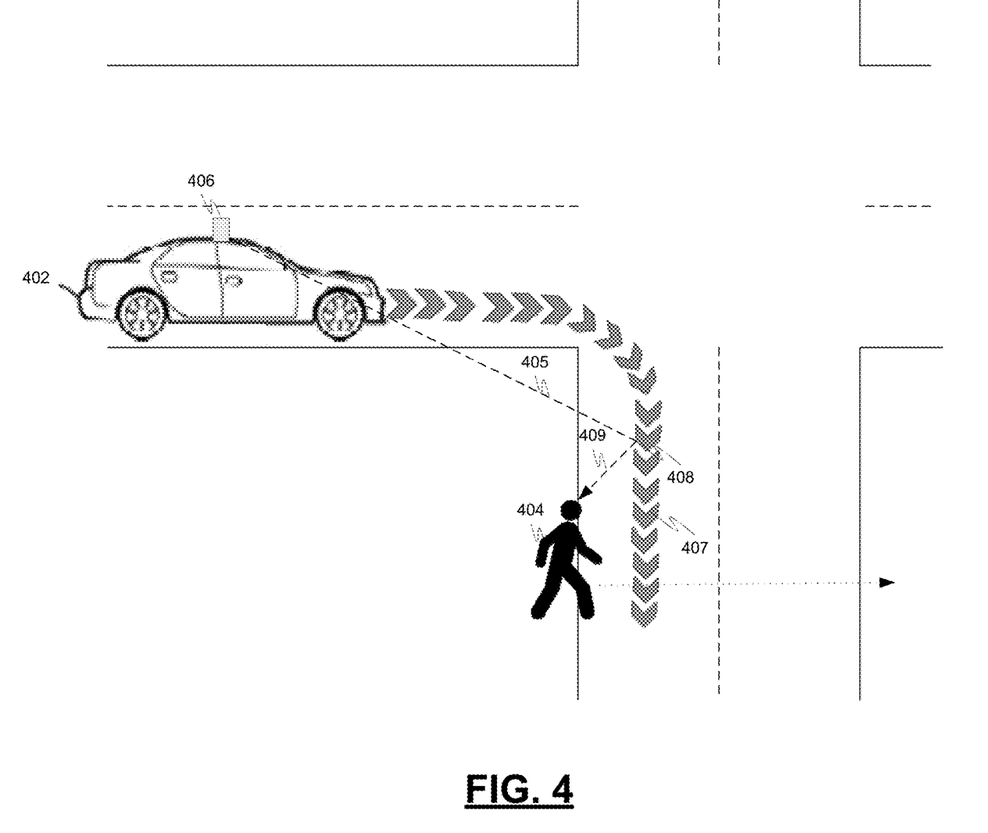

FIG. 4 is a diagram depicting another example operating scenario 400 for using an example pedestrian alerting system in a vehicle 402. The example pedestrian alerting system is configured to provide auditory guidance from the vehicle 402 to a pedestrian 404. In the example operating scenario 400, the vehicle 402 is an AV that may potentially encounter a jaywalker (pedestrian 404). In this example, directional sound can be used to alert the jaywalker of the vehicle 402 when the vehicle may not be within view (e.g., if the vehicle appears behind a curb).

Upon sensing the pedestrian 404, the AV 402 can identify a desire to communicate with the pedestrian 404 (e.g., alert that pedestrian that the AV will turn the corner and that the pedestrian is walking into the AV's path), determine a message to communicate to the pedestrian 404, (e.g., a stated warning or the sound of an engine revving, or a comparable electric car sound file with a visceral effect), calculate a travel path 407 (e.g., using vehicle sensor data and/or map data including calculating an azimuth to the pedestrian using vehicle sensors) about which to make the pedestrian 404 aware. Calculating a travel path, in this example, includes calculating a vehicle travel path that crosses a potential pedestrian travel path. The AV 402 can position (e.g., rotating left, right, up, down) a directional acoustic device 406 (e.g., directional speaker containing piezoelectric transducers capable of producing ultrasonic sound waves) to project directional sound waves 405 (e.g., a focused column of ultrasonic sound waves) to a starting point of the travel path 407; modulate the message in the directional sound waves 405; and repositioning (e.g., rotating left, right, up, down) the directional acoustic device 406 to project the directional sound waves 405 with the modulated message along the travel path 407, wherein as the directional sound waves 405 make contact with a travel path surface the message is demodulated and a sound 409 conveying the message appears to originate from and travel along the travel path 407. By changing the location of the point 408 at which the focused sound waves 405 make contact with the travel path surface, the pedestrian alerting system can create a sound path 407 wherein the sound appears to move along the path 407. By moving the contact point 408 along the path 407, the pedestrian alerting system can make the pedestrian 404 aware of the path 407.

Figure 5:
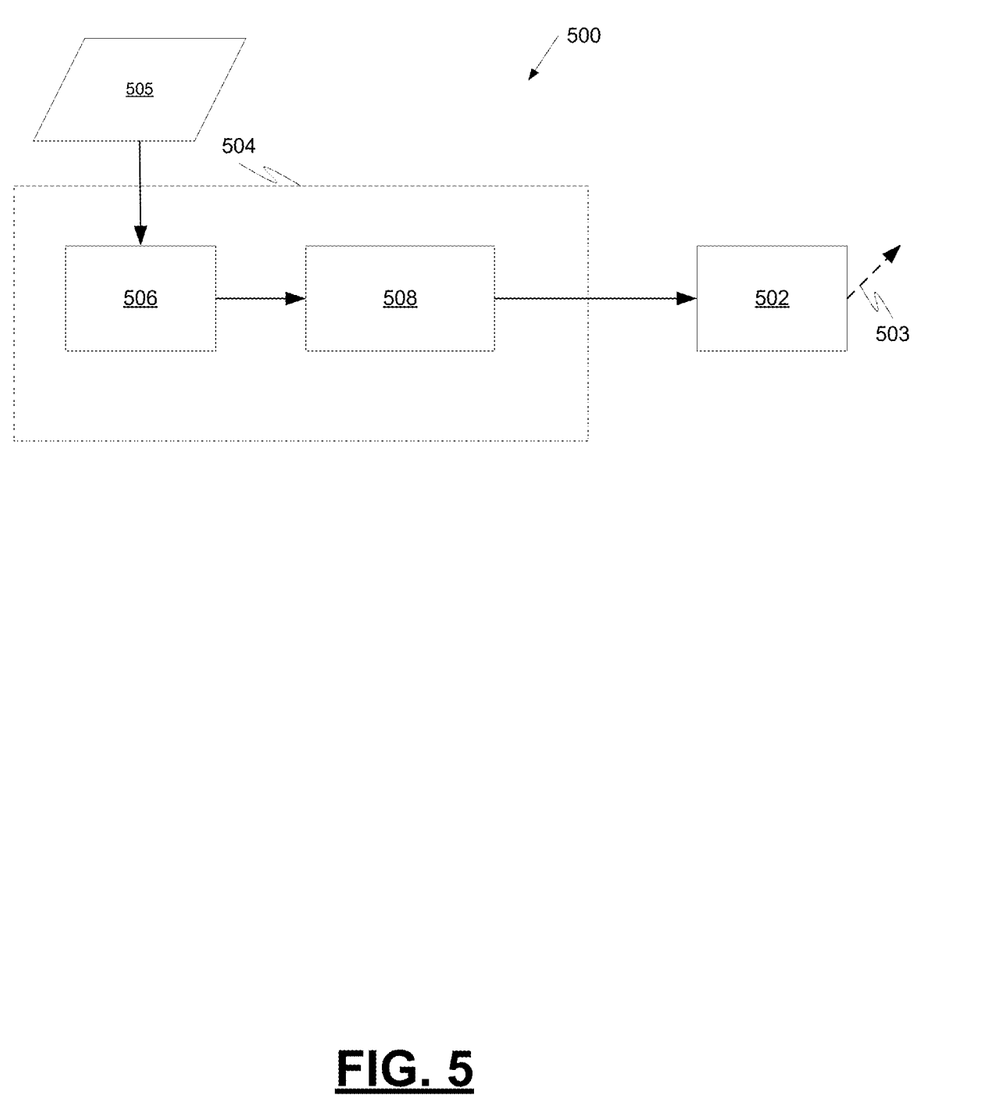
FIG. 5 is a block diagram depicting an example pedestrian alerting system, in accordance with various embodiments.

FIG. 5 is a block diagram depicting an example pedestrian alerting system 500. The example passenger alerting system 500 includes a directional acoustic device 502 (e.g., directional speaker containing piezoelectric transducers capable of producing ultrasonic sound waves) that can be positioned and repositioned (e.g., rotating left, right, up, down) to project directional sound waves 503 (e.g., a focused column of ultrasonic sound waves) in different directions.

The example pedestrian alerting system 500 further includes a pedestrian alerting module 504 that includes a pedestrian awareness module 506 and a communication control module 508. The example pedestrian alerting module 504 comprises one or more processors configured by programming instructions in computer readable media.

The example pedestrian awareness module 506 is configured to identify a desire by the vehicle to communicate with the pedestrian, determine a message to communicate to the pedestrian, and calculate a travel path (e.g., using vehicle sensor data and/or map data) about which to make the pedestrian aware. Calculating a travel path may include calculating a pedestrian travel path to or away from the vehicle (e.g., vehicle door). Calculating a travel path may include calculating a pedestrian travel path that crosses an intended vehicle travel path. Calculating a travel path may include calculating a vehicle travel path that crosses a potential pedestrian travel path (e.g., path across cross-walk, or jaywalking path). The example pedestrian awareness module 506 is configured to calculate a travel path using vehicle sensor data 505 and/or map data (e.g., vehicle sensor data from a camera, a lidar sensor, or a radar sensor).

The example communication control module 508 is configured to control (e.g., cause to rotate left, right, up, down) the position of the directional acoustic device 502 (e.g., directional speaker containing piezoelectric transducers capable of producing ultrasonic sound waves) to project directional sound waves 503 (e.g., a focused column of ultrasonic sound waves) to a starting point of a travel path; modulate the message in the directional sound waves 503; and reposition (e.g., cause to rotate left, right, up, down) the directional acoustic device 502 to project the directional sound waves 503 with the modulated message along the travel path, wherein as the directional sound waves 503 contact with a travel path surface the message is demodulated and a sound conveying the message appears to originate from and travel along the travel path.

The example communication control module 508 is further configured to reposition the directional acoustic device 502 to project a second set of directional sound waves with a second modulated message to a point to provide a second message to a second pedestrian that is different from the message to a first pedestrian (e.g., second message to second pedestrian alerting second pedestrian that vehicle is going to cross the crosswalk while the first pedestrian completes its crossing of the crosswalk).

Figure 6:
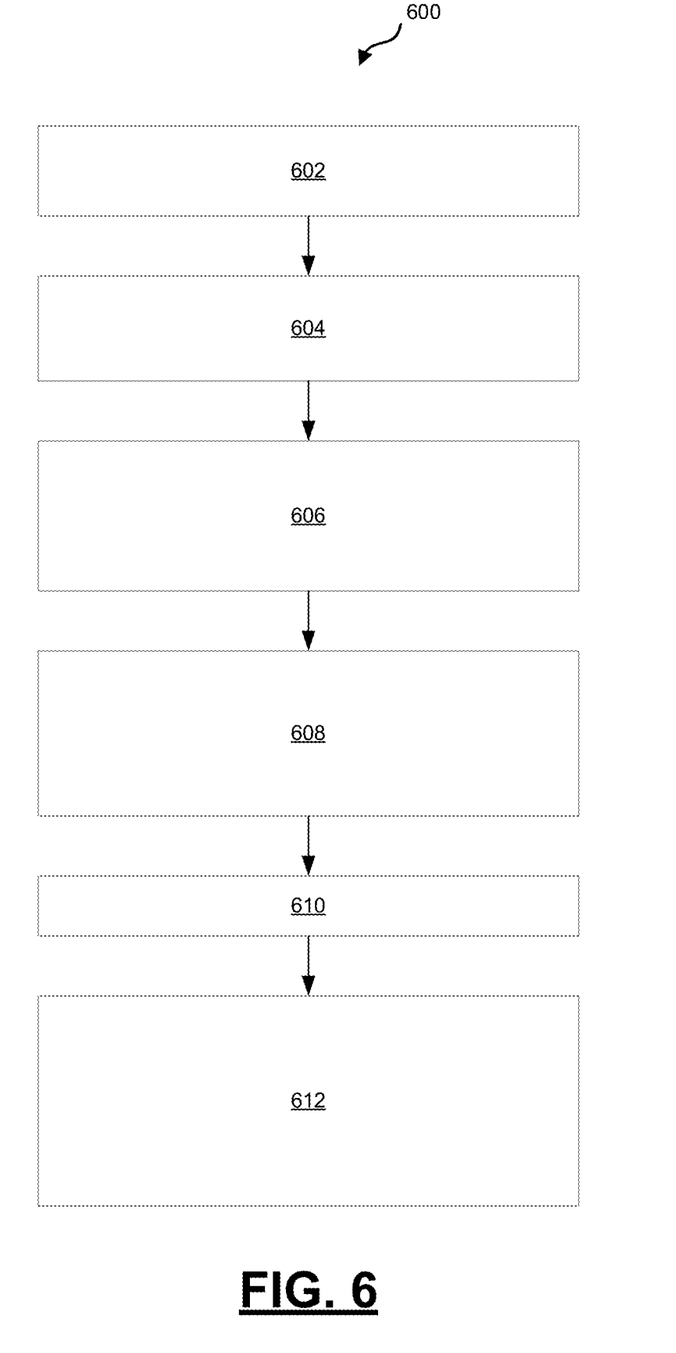
FIG. 6 is a process flow chart depicting an example process in a vehicle for providing auditory guidance to a pedestrian, in accordance with various embodiments.

FIG. 6 is a process flow chart depicting an example process 600 in a vehicle for providing auditory guidance to a pedestrian. The order of operation within the example process 600 is not limited to the sequential execution as illustrated in the figure, but may be performed in one or more varying orders as applicable and in accordance with the present disclosure.

The example process 600 includes identifying a desire to communicate with a first pedestrian (operation 602). The identifying a desire to communicate may include identifying (e.g., using vehicle sensors such as camera, radar, lidar) a first pedestrian who is to enter or exit the vehicle. The identifying a desire to communicate may include identifying (e.g., using vehicle sensors such as camera, radar, lidar) a first pedestrian who may cross a pathway to be traversed by the vehicle. The identifying a desire to communicate may include identifying (e.g., using vehicle sensors such as camera, radar, lidar) a first pedestrian who is positioned near to, moving toward, and/or entering the pathway to be traversed by the vehicle (e.g., near, moving toward, or entering crosswalk or jaywalker).

The example process 600 includes determining a message to communicate to a first pedestrian (operation 604). Determining a message to communicate may include identifying a message to communicate that instructs the first pedestrian to enter or exit the vehicle via the travel path communicated via the message (e.g., path to enter vehicle or path when exiting vehicle). Determining a message to communicate may include identifying a message to communicate that informs the first pedestrian that the vehicle is waiting for the first pedestrian to travel along the travel path communicated via the message (e.g., message to first pedestrian at crosswalk that vehicle is waiting for first pedestrian to cross the crosswalk before proceeding). Determining a message to communicate may include identifying a message to communicate that informs the first pedestrian that the vehicle intends to travel along the travel path communicated via the message (e.g., warning to first pedestrian at crosswalk that vehicle will proceed through crosswalk, or warning to jaywalker that vehicle is coming).

The example process 600 includes calculating a travel path (e.g., using vehicle sensor data and/or map data including calculating an azimuth to the first pedestrian using vehicle sensors) about which to make the first pedestrian aware (operation 606). Calculating a travel path may include calculating a pedestrian travel path to or away from the vehicle (e.g., vehicle door). Calculating a travel path may include calculating a pedestrian travel path that crosses an intended vehicle travel path. Calculating a travel path may include calculating a vehicle travel path that crosses a potential pedestrian travel path (e.g., path across cross-walk, or jaywalking path).

The example process 600 includes positioning (e.g., rotating left, right, up, down) a directional acoustic device (e.g., directional speaker containing piezoelectric transducers capable of producing ultrasonic sound waves) to project directional sound waves (e.g., a focused column of ultrasonic sound waves) to a starting point of the travel path (operation 608). When the directional sound waves contact with a travel path surface, the message is demodulated and a sound conveying the message appears to originate from and travel along the travel path.

The example process 600 includes modulating the message in the directional sound waves (operation 610) and repositioning (e.g., rotating left, right, up, down) the directional acoustic device to project the directional sound waves with the modulated message along the travel path (operation 612).

The example process 600 may further include repositioning the directional acoustic device to project a second set of directional sound waves with a second modulated message to a point to provide a second message to a second pedestrian that is different from the message to the first pedestrian (e.g., second message to second pedestrian alerting second pedestrian that vehicle is going to cross the crosswalk while the first pedestrian completes its crossing of the crosswalk).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

What is claimed is:

1. A processor-implemented method in a vehicle for providing auditory guidance, the method comprising:
identifying, by a processor in the vehicle, a desire to communicate with a first pedestrian;
determining, by the processor, a message to communicate to the first pedestrian;
calculating, by the processor, a travel path to instruct the first pedestrian to follow or that the vehicle intends to follow, the travel path having a surface; and
identifying the surface of the travel path by causing a rolling sound conveying the message to appear to emanate and travel, point by point, from a starting point along the surface of the travel path to an ending point along the surface of the travel path by:
positioning, using a vehicle actuator, a directional acoustic device to project directional sound waves to the starting point on the surface of the travel path;
modulating the message in the directional sound waves; and
repositioning, using the vehicle actuator, the directional acoustic device to project the directional sound waves with the modulated message along the surface of the travel path to the ending point, wherein as the directional sound waves contact with the surface of the travel path the message is demodulated and the rolling sound conveying the message appears to originate from and travel along the surface of the travel path.

2. The method of claim 1, wherein the identifying a desire to communicate comprises identifying a first pedestrian who is to enter or exit the vehicle.

3. The method of claim 1, wherein the identifying a desire to communicate comprises identifying a first pedestrian who may cross a pathway to be traversed by the vehicle.

4. The method of claim 3, wherein the identifying a desire to communicate further comprises identifying a first pedestrian who is positioned near to, moving toward, or entering the pathway to be traversed by the vehicle.

5. The method of claim 1, wherein determining a message to communicate comprises identifying a message to communicate that instructs the first pedestrian to enter or exit the vehicle via the travel path communicated via the message.

6. The method of claim 1, wherein determining a message to communicate comprises identifying a message to communicate that informs the first pedestrian that the vehicle is waiting for the first pedestrian to travel along the travel path communicated via the message.

7. The method of claim 1, wherein determining a message to communicate comprises identifying a message to communicate that informs the first pedestrian that the vehicle intends to follow the travel path.

8. The method of claim 1, wherein calculating a travel path comprises calculating a pedestrian travel path to or away from the vehicle.

9. The method of claim 1, wherein calculating a travel path comprises calculating a pedestrian travel path that crosses an intended vehicle travel path.

10. The method of claim 1, wherein calculating a travel path comprises calculating a vehicle travel path that crosses a potential pedestrian travel path.

11. The method of claim 1, further comprising repositioning the directional acoustic device to project a second set of directional sound waves with a second modulated message to a point to provide a second message to a second pedestrian that is different from the message to the first pedestrian.

12. A pedestrian alerting system in a vehicle, the pedestrian alerting system comprising:
a first module configured to:
identify a desire to communicate with a first pedestrian;
determine a message to communicate to the first pedestrian; and
calculate a travel path to instruct the first pedestrian to follow or that the vehicle intends to follow, the travel path having a surface; and
a second module configured to identify the surface of the travel path by causing a rolling sound conveying the message to appear to emanate and travel, point by point, from a starting point along the surface of the travel path to an ending point along the surface of the travel path, to identify the surface of the travel path the second module is configured to:
position a directional acoustic device to project directional sound waves to the starting point on the surface of the travel path;
modulate the message in the directional sound waves; and
reposition the directional acoustic device to project the directional sound waves with the modulated message along the surface of the travel path, wherein as the directional sound waves contact with the surface of the travel path the message is demodulated and the rolling sound conveying the message appears to originate from and travel along the surface of the travel path.

13. The pedestrian alerting system of claim 12, wherein the second module is further configured to reposition the directional acoustic device to project a second set of directional sound waves with a second modulated message to a point to provide a second message to a second pedestrian that is different from the message to the first pedestrian.

14. The pedestrian alerting system of claim 12, wherein calculating a travel path comprises calculating a pedestrian travel path to or away from the vehicle.

15. The pedestrian alerting system of claim 12, wherein calculating a travel path comprises calculating a pedestrian travel path that crosses an intended vehicle travel path.

16. The pedestrian alerting system of claim 12, wherein calculating a travel path comprises calculating a vehicle travel path that crosses a potential pedestrian travel path.

17. An autonomous vehicle comprising:
a directional acoustic device; and
a pedestrian alerting module configured to:
identify a desire to communicate with a first pedestrian;
determine a message to communicate to the first pedestrian;
calculate a travel path to instruct the first pedestrian to follow or that the vehicle intends to follow, the travel path having a surface; and
identify the surface of the travel path by causing a rolling sound conveying the message to appear to emanate and travel, point by point, from a starting point along the surface of the travel path to an ending point along the surface of the travel path, to identify the surface of the travel path the pedestrian alerting module is configured to:
position the directional acoustic device to project directional sound waves to the starting point on the surface of the travel path;
modulate the message in the directional sound waves; and
reposition the directional acoustic device to project the directional sound waves with the modulated message along the surface of the travel path, wherein as the directional sound waves contact with the surface of the travel path the message is demodulated and the rolling sound conveying the message appears to originate from and travel along the surface of the travel path.

18. The autonomous vehicle of claim 16, wherein the directional acoustic device comprises a directional speaker containing piezoelectric transducers configured to produce ultrasonic sound waves.

19. The autonomous vehicle of claim 16, wherein the directional sound waves comprise a focused column of ultrasonic sound waves.

20. The autonomous vehicle of claim 16, wherein the pedestrian alerting module is configured to calculate the travel path using vehicle sensor data and/or a map.

* * * * *